Figure 5:
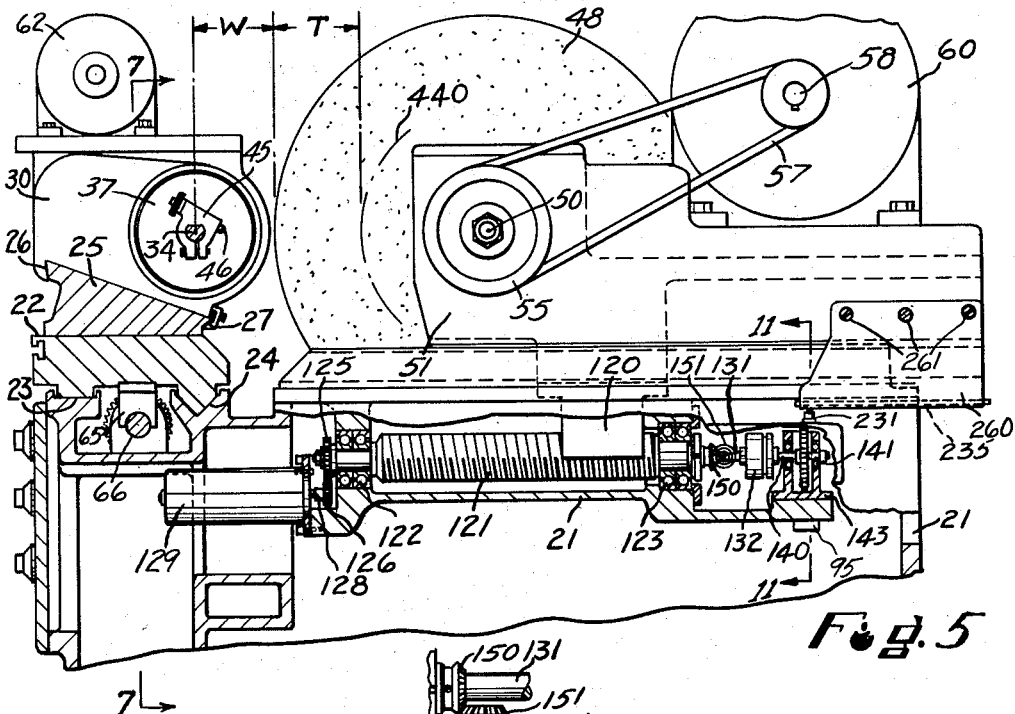

Jan. 6, 1959 G. E. COMSTOCK 3D 2,867,759
SERVOMOTOR CONTROL SYSTEM ADAPTED FOR MACHINE TOOL USE
Filed July 12, 1954 7 Sheets-Sheet 1
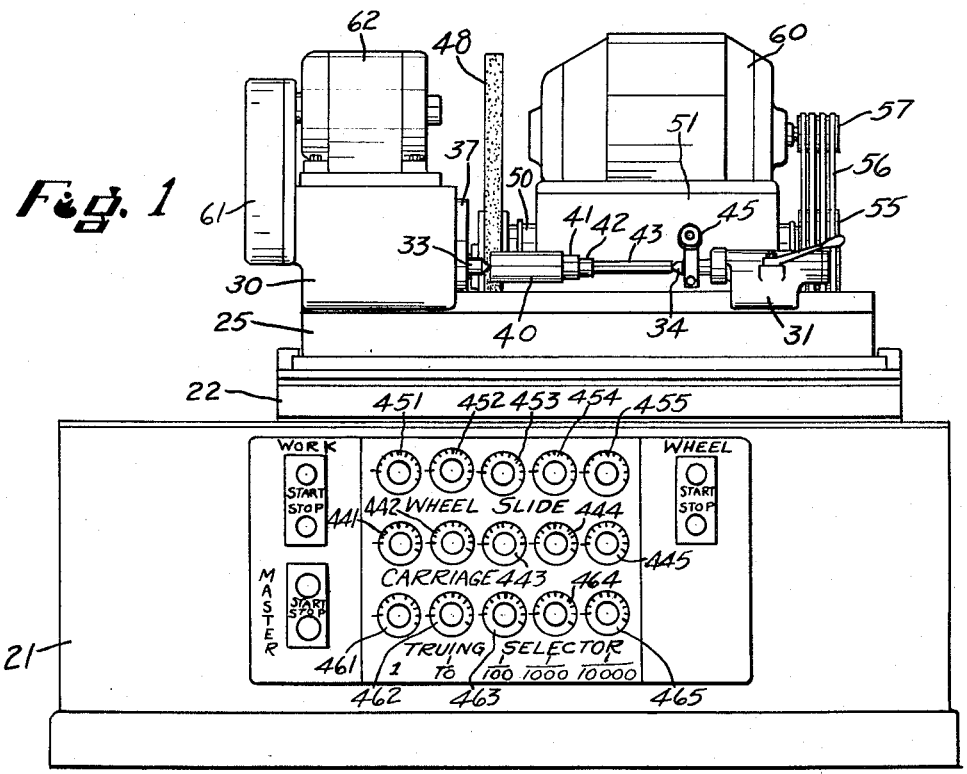
Fig. 1
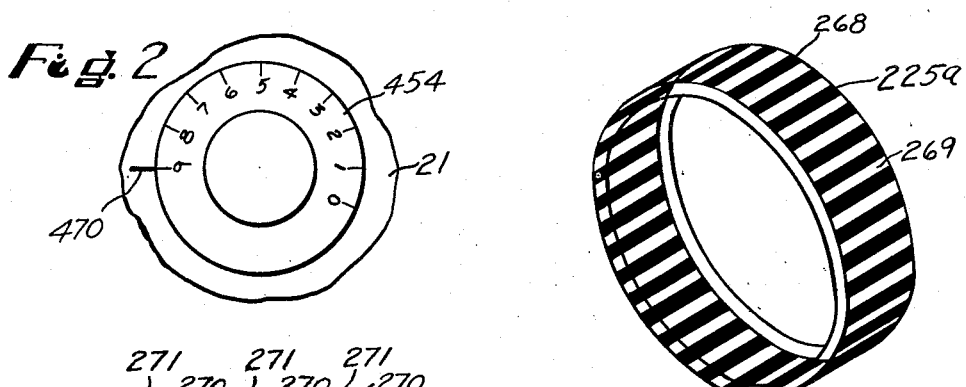
Fig. 2
Fig. 3
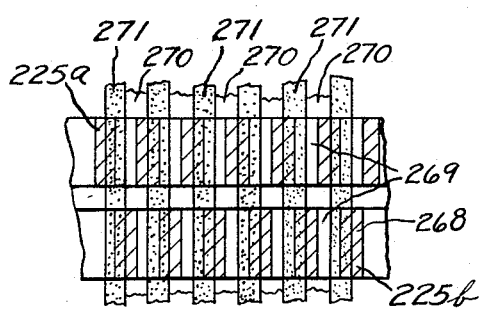
Fig. 4
INVENTOR.
GEORGE E. COMSTOCK 3rd
BY
George Comstock Jr.
ATTORNEY INVENTOR.
GEORGE E. COMSTOCK 3rd.
BY
ATTORNEY

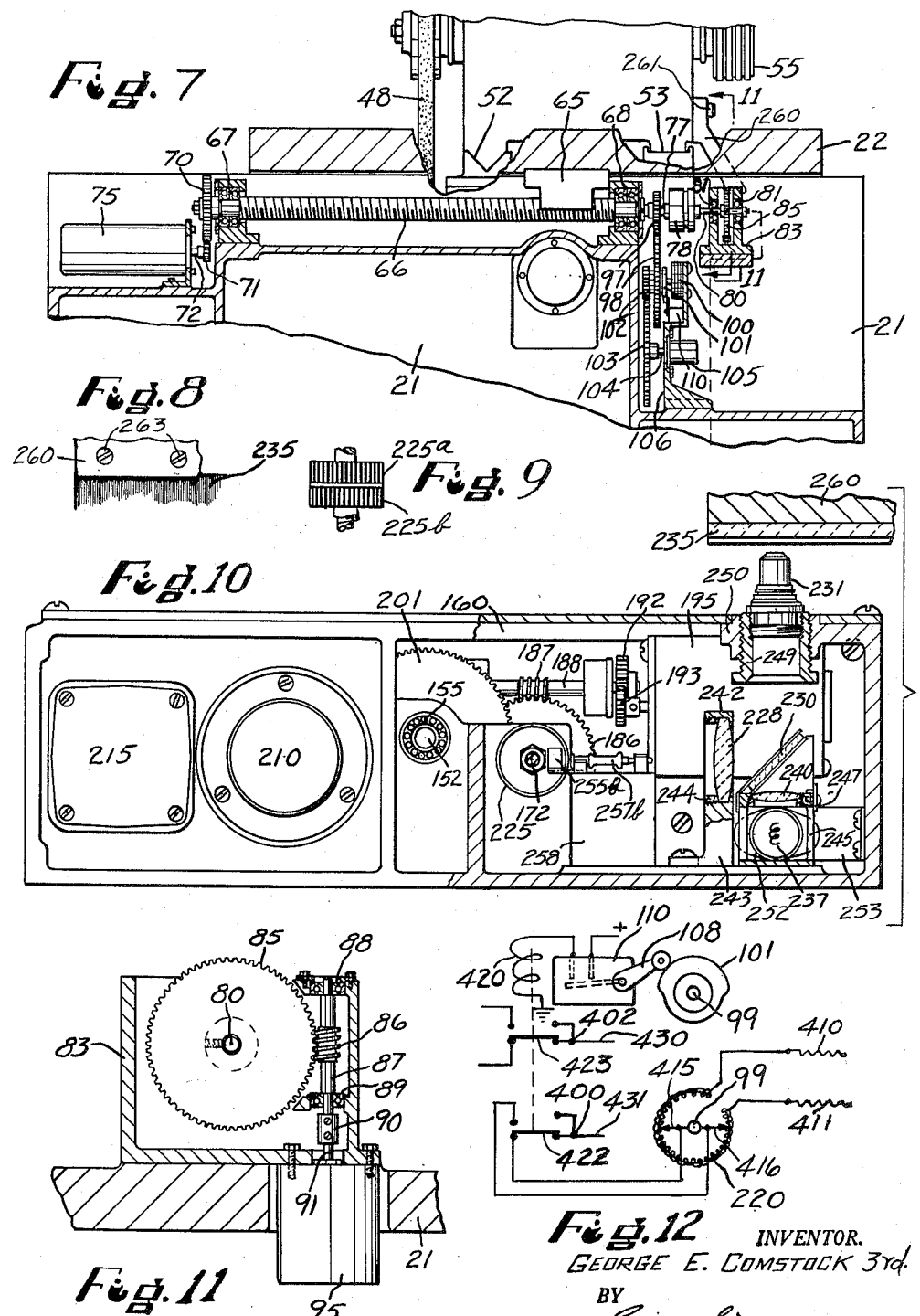

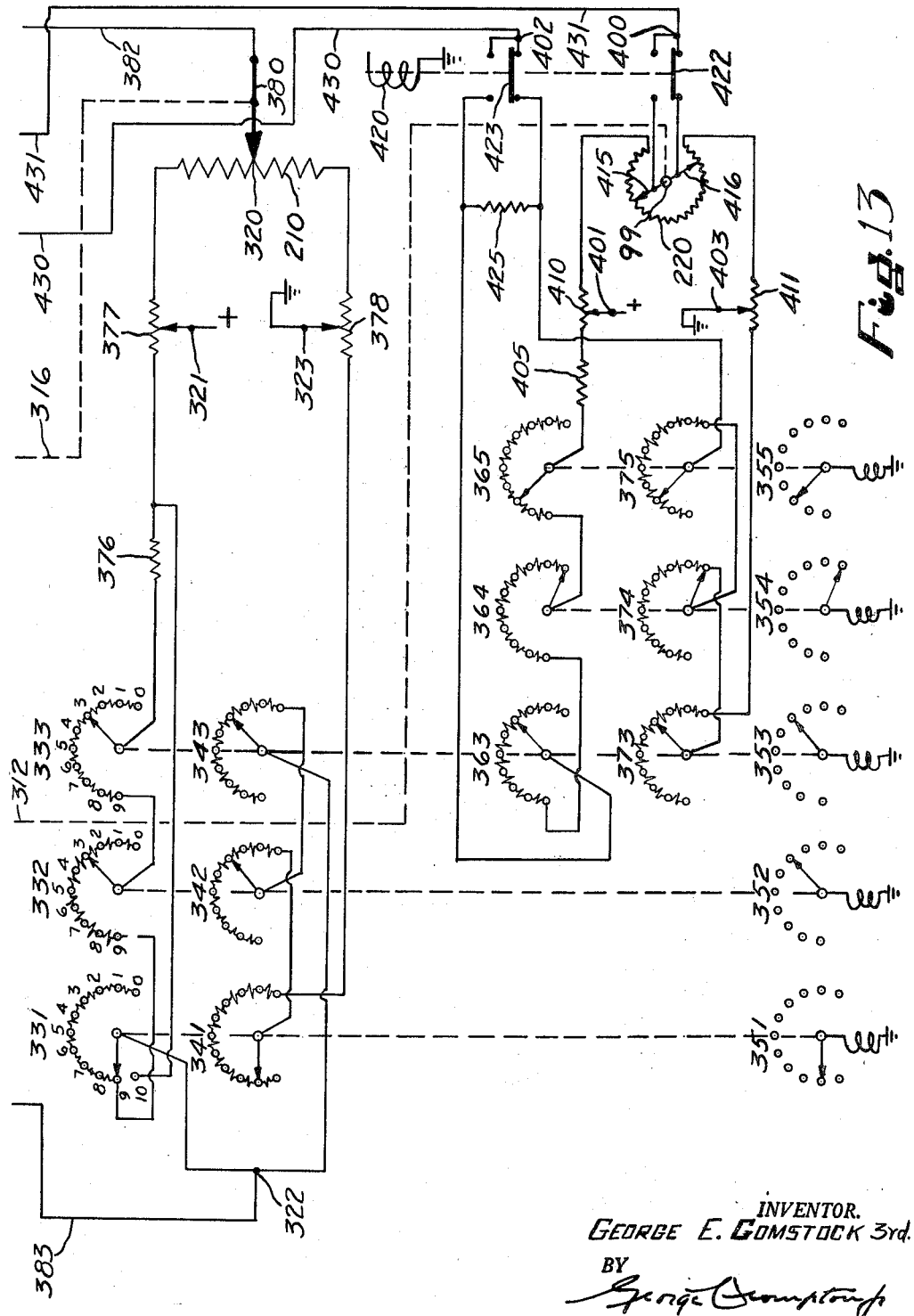

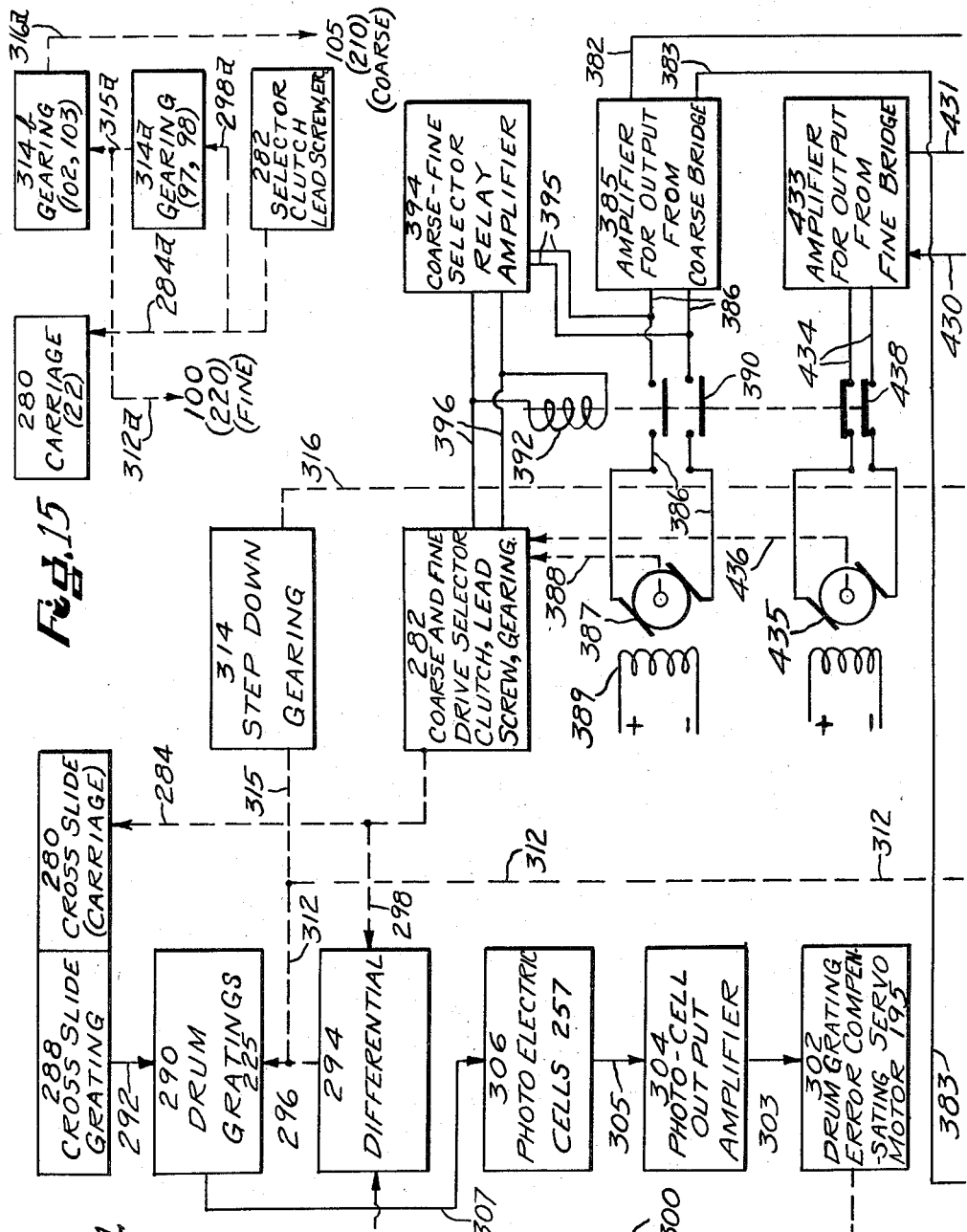

United States Patent Office 2,867,759
Patented Jan. 6, 1959

2,867,759

SERVOMOTOR CONTROL SYSTEM ADAPTED FOR MACHINE TOOL USE

George E. Comstock 3d, Holden, Mass., assignor to Norton Company, Worcester, Mass., a corporation of Massachusetts Application July 12, 1954, Serial No. 442,644

17 Claims. (Cl. 318—29)

The invention is a micrometric long distance transducer and positioning apparatus.

One object of the invention is to provide a superior mechanism for moving a slide, table or carriage to a position removed from a reference point by a distance certain, accurate in the English system to within a ten thousandth of an inch. Another object of the invention is to achieve the above in two or three dimensions as may be desired. Another object of the invention is to provide a system of electric controls that will accurately measure the position and displacement of mechanical parts making allowances and correction for imperfection of the mechanical units associated therewith. Another object of the invention is to provide a simple non-deviating measuring instrumentality determining with accuracy the position of a carriage, table or slide and further instrumentalities to correct the drive for moving such carriage, table or slide whereby to locate the same accurately responsive to movement to a new position. Another object of the invention is to provide measuring apparatus accurately to measure the position of an element of a machine tool. Another object of the invention is to provide electrical addition computers for totaling the displacement required on account of truing and the displacement required on account of the proposed size of the workpiece. Another object of the invention is to cause the foregoing addition computers to set selector switches and to move machine tool elements by a servo motor responsive to the selector switches. Another object is to compensate the servo motor for errors in the mechanical elements of the drive such as in the lead screw and associated gearing. Another object is to provide means for positioning a moving machine element in response to commands inserted in digital form. Another object is to drive a control element from the main drive and to correct it differentially whereby the correction unit does a minimum of work thus achieving greater accuracy with less wear and servicing.

Another object of the invention is to provide position indicating mechanism of great accuracy which is not sensitive to changes of temperature, accuracy of machining of parts or warping due to age or strain. Another object is to provide such a position indicating mechanism together with photoelectric pickup and amplifying means to correct the position of a machine element.

Other objects will be in part obvious or in part pointed out hereinafter.

In the accompanying drawings illustrating one of many possible embodiments of the mechanical, electrical and optical features of this invention, which is illustrated as being embodied in a grinding machine but can be embodied in many different kinds of machines, Figure 1 is a front elevation of a grinder to which the invention is applied, Figure 2 is an enlarged view of a control knob, Figure 3 is a view in perspective of a cylindrical grating, Figure 4 is a diagrammatic representation of the manner in which the optical image of the primary grating is superimposed upon the secondary grating, Figure 5 is a view partly in side elevation and partly in vertical section of the carriage, the cross slide, and certain mechanical elements of the grinder including the wheel slide feed screw and associated mechanism.

Figure 6:
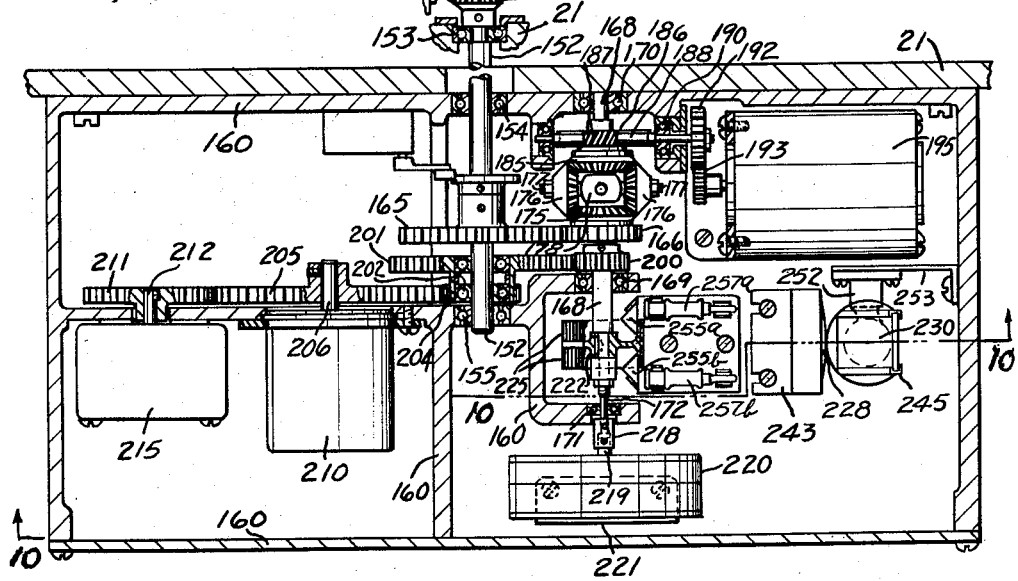
Figure 16:
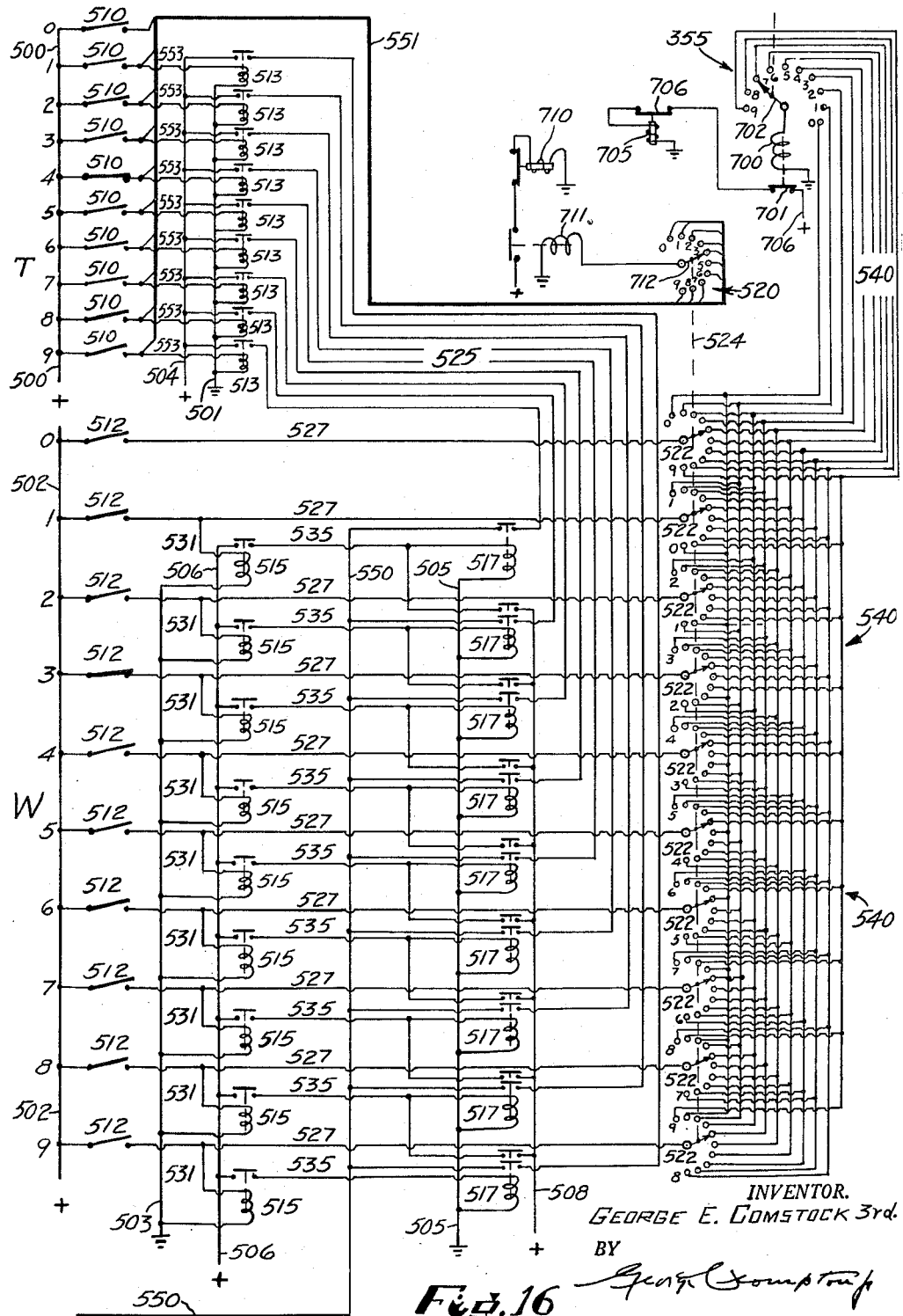
Figure 17:
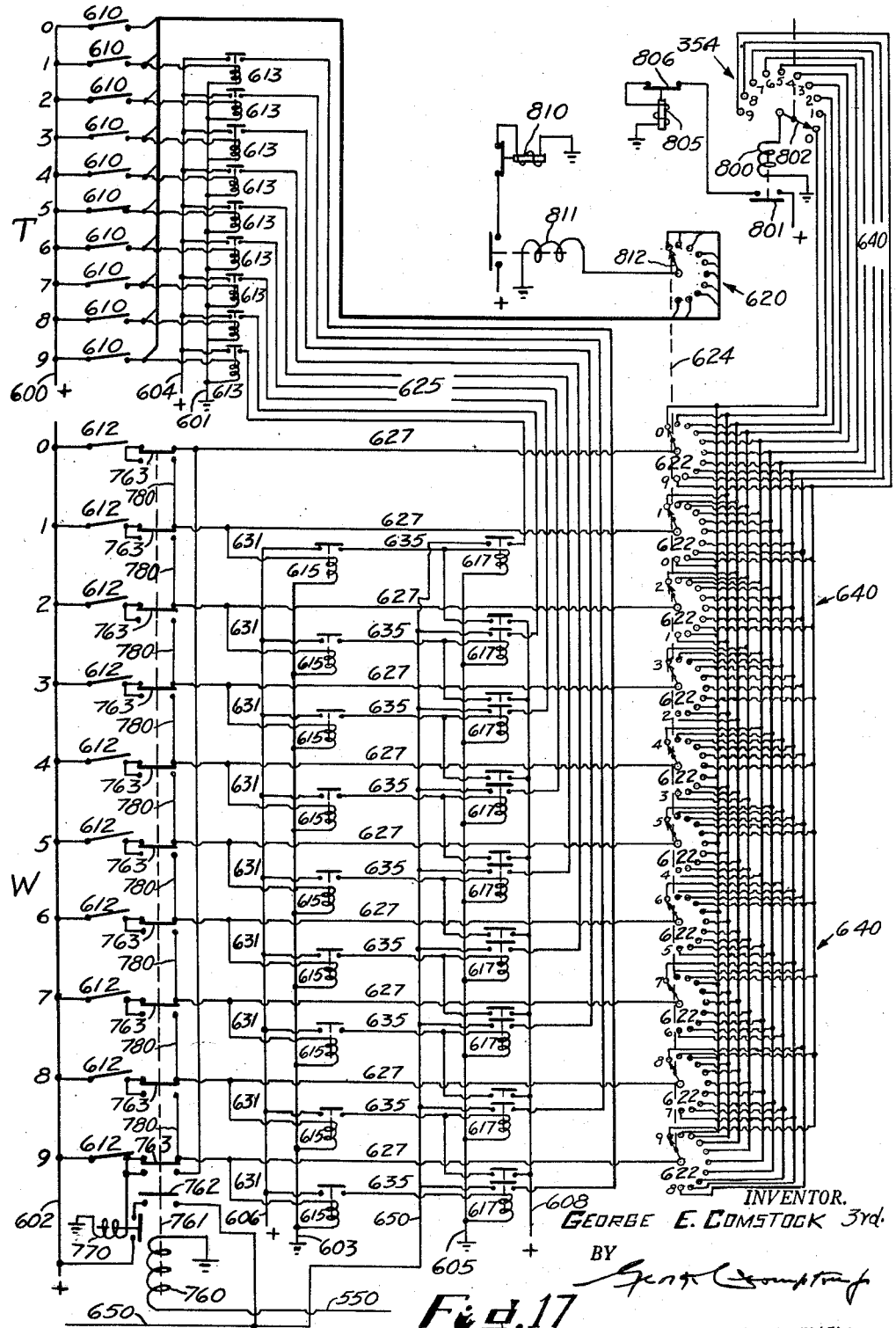

Figure 6 is a view partly in plan and partly in horizontal section of wheel slide position detecting mechanism including anti-backlash torque motor, a coarse position detecting potentiometer, a fine position detecting potentiometer, a cylindrical optical grating, differential gearing, photoelectric cell detectors, a cylindrical grating corrective drive servo motor and associated mechanism, Figure 7 is a vertical sectional view taken on the line 7—7 of Figure 5, Figure 8 is a view from below of an optical grating and a mounting therefor, highly magnified compared with Figure 9, Figure 9 is a plan view of a pair of cylindrical optical gratings, Figure 10 is a side elevation of the mechanism illustrated in Figure 6 with the right hand part shown in section along the line 10—10 of Figure 6, Figure 11 is a sectional view on an enlarged scale taken along the line 11—11 of Figures 5 and 7, Figure 12 is a diagram of a potentiometer and its control, Figure 13 is an electrical diagram of the position control mechanism, Figure 14 is a mechanical and electrical diagram of the position control mechanism, being in reality an extension of the diagram of Figure 13 and in fact if Figures 13 and 14 are matched, with Figure 14 on top of Figure 13, and the short sides in line, they become on drawing, Figure 15 is a modification of a diagram of Figure 14 as to part thereof to show changes for operating the carriage, Figures 16 and 17 are wiring diagrams illustrating how the wheel slide and truing dials set the selector switches.

The invention is illustrated as applied to a grinder, specifically a cylindrical grinder, but it has as many applications as there are machines which require some part to be moved from one position to another one very accurately. Thus the invention can be embodied in any machine tool, including without limitation, other grinding machines, jig borers, cam generating equipment and the like. The invention can also be embodied in a strictly measuring apparatus where a unit is moved by coarse and fine increments and the operator, with the use of apparatus constructed in accordance with this invention, is informed exactly where the unit is. One example is the determination of the contour of irregular objects such as cams and form bars. Another example is the determination of the position of sine bars, cams and the like.

Referring now to Figure 1, the grinding machine therein illustrated has a base 21. On the base 21 is mounted a carriage 22 on ways 23 and 24 (see Figure 5) on which is mounted a swivel table 25 having ways 26 and 27 upon which is adjustably clamped a headstock 30 and a tailstock 31. The headstock has the usual live center 33 and the tailstock has the usual tail center 34 which is adjustable in the manner well known and need not be described herein. The usual driving dog, not shown, having a tail fitting the face plate 37 drives the workpiece 40 having reduced portions 41, 42 and 43 which are to be ground, the full diameter portion having assumably been previously ground in another setup.

Referring now to Figure 5, clamped to the tail center 34 is a truing tool 45 having an adjustable diamond 46 for dressing and truing the peripheral face of a grinding wheel 48 which is mounted on a spindle 50 which is journalled in a cross slide 51 mounted on a rear portion of the base 21 for movement on ways (see now Figure 7) 52 and 53 provided by the base 21 in a direction transverse to the movement of the carriage 22, usually at right angles thereto.

Secured to the spindle 50 is a pulley 55 which is driven by belts 56 which in turn are driven by a small pulley 57 on the armature shaft 58 of an electric motor 60 which is secured to the upper part of the cross slide 51.

The headstock face plate 37 is secured to a spindle, not shown, journalled in the headstock 30 and by means of a V-belt drive in casing 61 is driven by another electric motor 62 secured to the top of the headstock 30.

Referring now to Figure 7, secured to the under side of the carriage 22 is a half nut 65. This half nut 65 is moved by a lead screw 66 which is journalled in ball bearings 67 and 68 and having at the left hand end secured thereto a spur gear 70 in engagement with a pinion gear 71 on the shaft 72 of a servo motor 75. This servo motor 75 revolves the screw 66 at a relatively high speed for rapidly moving the carriage 22 to approximately the position desired.

Referring now to the right hand side of Figure 7, the lead screw 66 has a reduced portion 77 extending into an electromagnetic clutch 78 being secured to one element thereof. The other element thereof is secured to a shaft 80 which is journalled in ball bearings 81 in a frame 83 secured to the base 21. Between the two sets of bearings 81 there is secured to the shaft 80 a worm gear 85 which is better shown in Figure 11. Engaging the worm gear 85 is a worm 86 which is part of a shaft 87 journalled in ball bearings 88 and 89 in the frame 83. This shaft 87 is coupled by means of a coupling 90 to the shaft 91 of a servo motor 95. This servo motor 95 does the final positioning of the carriage 22 with a high degree of accuracy by turning the lead screw 66 through slight increments.

Referring again to Figure 7 secured to the reduced portion 77 is a spur gear 97 which drives a large gear 98 which is secured to the shaft 99 (referring to Figure 12) of a potentiometer 100. Also secured to the shaft 99 of the potentiometer 100 is a cam 101 and a spur gear 102. This spur gear 102 meshes with a large gear 103 on the shaft 104 of a potentiometer 105. The potentiometers 100 and 105 are mounted on a frame 106 secured to the base 21. Referring now to Figure 12 although the parts are indicated in Figure 7, the cam 101 engages the arm 108 of a limit switch 110. This limit switch 110 controls the potentiometer 100, selecting that wiper arm (there are two) of the potentiometer which is opposite the dead zone thereof.

Referring now to Figure 5, secured to the under side of the cross slide 51 is a half nut 120. This half nut 120 is moved by a lead screw which is journalled in ball bearings 122 and 123 and having at the left hand end a spur gear 125 in engagement with a pinion gear 126 on the shaft 128 of a servo motor 129. This servo motor 129 revolves the screw 121 at a relatively high speed for rapidly moving the cross slide 51 to approximately the position desired.

Referring now to the right hand side of Figure 5, the lead screw 121 has a reduced portion 131 extending into an electromagnetic clutch 132, being secured to one element thereof. The other element thereof is secured to a shaft 140 which is journalled in ball bearings 141 in a frame 143 secured to the base 21. The construction and arrangement of these and associated parts are similar to those shown in Figure 11.

Referring now to Figure 6 and starting with the upper part thereof, secured to the reduced portion 131 is a bevel gear 150 which meshes with a bevel gear 151 on and secured to a shart 152 journalled in ball bearings 153 and in ball bearings 154 and 155, the latter being at the lower end of the shaft. Ball bearings 153 are supported in the base 21 while ball bearings 154 and 155 are supported by a box-like casing 160 compartmented as shown. Secured to the shaft 152 between the ball bearings 154 and 155 is a large gear 165 which meshes with a gear 166 which is mounted on but not secured to a shaft 168 journalled in ball bearings 169 and 170 mounted in the casing 160. There is additionally a further set of ball bearings 171 journalling a reduced portion 172 of the shaft 168 which set of ball bearings 171 is supported in a portion of the casing 160.

The gear 166 has integrally secured thereto a bevel gear 175 which meshes with a pair of planetary bevel gears 176 rotatably mounted on studs 177 extending from a block 178 pinned to the shaft 168 so that whenever the bevel gears 176 revolve orbitally they rotate the shaft 168. But diurnal motion of the bevel gears 176 will not necessarily cause orbital motion thereof because they mesh with a bevel gear 185 opposite the bevel gear 175 and the gear 185 is also free on the shaft 168 and is connected to a worm wheel 186.

Still referring to Figure 6 but also referring to Figure 10, meshing with the worm wheel 186 is a worm 187 integral with a shaft 188 journalled in ball bearings 190 supported by the casing 160. Secured to the right hand end of the shaft 188 is a gear 192 which meshes with a small gear 193 secured to the shaft of a servo motor 195. This servo motor is attached to a bracket portion of the casing 160. This servo motor 195 rotates responsive to an input which will be later described. It will now be seen that if and when the gear 166 responsive to the drive described rotates clockwise at a given speed and the worm wheel 186 revolves counterclockwise at the same speed, the planetary bevel gears will have no orbital motion although they will be revolving diurnally. Actually, of course, the gear 165 rotates continuously while the lead screw 121 is rotating. Taking the case when the worm wheel 186 is stationary which holds the bevel gear 185 stationary, the orbital speed of the planetary system is half the speed of the revolution of the gear 166 which revolves at double the rate of the gear 165. In that case the shaft 168 will be turned at the same speed as the shaft 152. Thus whenever the worm wheel 186 revolves in the same direction as the gear 166 the shaft 168 is speeded up with respect to the shaft 152 and when the worm wheel 186 revolves in the opposite direction to which the gear 166 revolves the shaft 168 revolves slower than the shaft 152.

Still referring to Figure 6, secured to the shaft 168 just to one side of the ball bearing 169 is a gear 200 which therefore revolves whenever the shaft 168 revolves. This gear 200 meshes with a large gear 201 journalled in ball bearings 202 supported by the shaft 152 but the gear 201 is merely thus supported by the shaft 152 and not driven by it. Integrally secured to the large gear 201 is a pinion gear 204 supported by one of the pair of ball bearings 202 and this gear 204 meshes with a large gear 205 which is secured to the shaft 206 of a multi-turn potentiometer 210 suitably supported in the casing 160. The gear 205 meshes with another gear 211 which is secured to the shaft 212 of an anti-backlash torque motor 215.

Coupled to the reduced portion 172 by means of a coupling 218 is a shaft 219 of a potentiometer 220. The potentiometer 220 is suitably supported in the casing as by means of a bracket 221. Secured to the shaft 168 is a hub 222 supporting cylindrical gratings 225. These are shown in Figure 6 and marked 225a and 225b. Each of the cylindrical gratings 225 is a right circular cylinder of a transparent material such as glass having a pattern on the outer cylindrical surface thereof consisting of bands alternately opaque and transparent running parallel to the axis of the cylinder. One way of preparing a cylindrical grating of the nature described is to apply a photosensitive emulsion to the outside cylindrical surface of a suitable glass blank, exposing the areas of this emulsion which are to be the opaque zones by means of a suitable optical system imaging a white line on a black background, making successive exposures and indexing the glass blank between. The latent image so produced is developed and fixed in the customary manner to obtain the finished pattern.

Referring to the right hand side of each of Figures 6 and 10, the cylindrical gratings 225 receive light from a lens 228 which receives light from a partial mirror 230 which receives light from an objective lens system 231 which in turn receives light reflected from a plane grating 235 which receives light from the same objective lens system 231 originating in a light source 237 through a condensing lens 240 through the partial mirror 230 which also transmits light. The partial mirror is preferably one which transmits about 50% of the light and reflects the other 50% and such mirrors can be made by coating a piece of glass with a thin layer of silver, in this case the upper surface being coated with the silver, the technique of making such mirrors being known in the art.

Constructionally the lens 228 is mounted in a ring 242 integral with a bracket 243 and held in place by a retaining ring 244, the bracket 243 being secured to the casing 160. The partial mirror 230 is held in place by a bracket 245 which holds a ring 247 which supports the lens 240, the bracket 245 being also secured to the casing 160. The objective lens system 231 is mounted in an internally and externally threaded sleeve 249 which in turn is mounted in an internally threaded portion 250 of the casing 160 and it will be readily seen that by turning the sleeve 249 in the portion 250 the lens system 231 can be properly focused. The bulb 252 in which is located the filament light source 237 is supported by a bracket 253 secured to the inside of the casing 160.

Light passing through the two components 225a and 225b of the cylindrical grating is received by prisms 255a and 255b and reflected onto photoelectric cells 257a and 257b. These parts are supported by an insulating block 258.

Referring now to Figure 8, the plane grating 235 is supported by a slideway bracket 260 the under side of which is illustrated in Figure 8. Referring now to Figure 5, this bracket 260 is secured to the outside of the wheel slide 51 by means of screws 261 so that the plane grating 235 is located over the lens system 231 which is supported by the casing 160 mounted on the side of the base 21. The plane grating 235 may be adjusted to the desired position in the bracket 260 and then secured in position by screws 263. The plane grating 235 is a piece of glass having thereon reflective and non-reflective bands alternating with each other and spaced apart at the same increments as the bands on the cylindrical grating 225 divided by the magnifying power of the lens system described. The lines are oriented perpendicular to the travel of the cross slide 51. The plane grating 235 can be constructed by evaporating a film of a suitable metal, such as aluminum, onto a glass blank, then ruling with a ruling engine the non-reflective lines by scraping off the aluminum in those portions which are to be non-reflective.

Figure 3 shows one unit or one-half of the total drum 225 for example the drum grating 225a although the drum grating 225b is identical therewith. The two drum grating elements or components 225a and 225b are mechanically coupled to each other so that the grating bands 268 and 269 (Fig. 4), the former being opaque and the latter transparent, are in staggered relation, an opaque band 268 of one being exactly opposite a transparent and transmitting band 269 of the other. As shown in Figure 4 the bright bands 270 of the image of the plane grating 235 formed by the optical system described are superimposed on the cylindrical gratings 225a and 225b in such a way that each half of each bright band 270 falls one-half on an opaque band 268 of the drum grating 225 and one half on a transmitting band 269 of the drum grating 225. The dark bands (no light) are indicated at 271. As may be seen from Figure 4, when the above special relationship of the bright bands 270 of the image with respect to the opaque and transmitting bands 268 and 269 of the cylindrical gratings are as described, then equal amounts of light are transmitted through each of the halves 225a and 225b of the cylindrical grating. This transmitted light is directed by prisms 255a and 255b respectively to photocells 257a and 257b in Figure 6. Again referring to Figure 4, if for some reason the bright bands 270 do not fall in the 50–50 relationship with respect to the bands of the drum grating 225, for example if the bright bands 270 are displaced slightly to the right in Figure 4, then the bright bands 270 fall more on the transmitting portion 269 of drum grating 225a and more on the opaque bands 268 of drum grating 225b. Thus the amount of light falling upon photocell 257a increases while the amount of light falling on the photocell 257b decreases. Similarly if the bands 270 are displaced to the left in Figure 4, the reverse action takes place with photocell 257a receiving less illumination and 257b receiving more. Stating this another way, when the cross slide 51 is moving in perfect synchronism with the drum grating 225, which it theoretically does if each mechanical part is perfect (which they never collectively are), the one-half of the light band 270 impinging upon the grating 225a passes, one-half of it, through the grating to a transparent band 269 and the other half of it is blocked by an opaque band 268, while the same thing happens to the other half of light band 270 but it is the leading half of one of the halves and the trailing half of the other half; if the slide 51 gets ahead of its ideal position the leading quarters are increased while the trailing quarters are decreased, so then the cell 257a receives more light than the cell 257b, and the opposite occurs when the slide 51 lags behind its ideal position. The path of the light in accordance with the previous description is, looking now at Figs. 6 and 10, from the light source 237, through the condensing lens 240, through the partial mirror 230, through the objective lens system 231, to the plane grating 235, back through the objective lens system 231, to the partial mirror 230 which reflects some of it, through the lens 228, through the transmitting bands 269 of the drum grating 225 (see Figs. 3 and 4) through the prisms 255a and 255b which reflect the light twice as all prisms do when set as shown in Fig. 6, then to the photocells 257a and 257b.

The photocells 257 are connected into a control circuit subsequently to be described which operates in such a manner as to maintain a balanced condition between the two beams falling on photocells 257 by causing the drum grating or cylindrical grating 225 to advance or retard in its motion so that it remains always synchronized with the motion of the image, that is with the bright bands 270, in the relationship shown in Figure 10. Thus the interrelationship between the plane grating 235, the optical system described, and the cylindrical grating 225 may be likened to that of a mechanical rack and pinion wherein linear translatory motion of the rack is converted into rotational motion of the pinion. In the system described because of the high degree of magnification afforded by the optical system a relatively large rotational angle of the cylindrical grating (corresponding to the pinion) is produced by a relatively small translatory motion of the plane grating (corresponding to the rack). For example if the magnification of the optical system is 40 × in linear dimension and further if the circumference of the cylindrical grating 225 is four inches, then one-tenth of an inch motion of the plane grating 235 will require one complete revolution of the cylindrical grating. In this example I may conveniently choose the width of the reflective and non-reflective zones of the plane grating 235 to be one thousandth of an inch. Then the width of the corresponding opaque and transmitting bands on the cylindrical grating will be forty thousandths of an inch and there will be 50 transparent bands and 50 opaque bands around the circumference of the cylinder.

Referring now to the upper part of Figure 14 I show a block 280 representing the cross slide 51. To the right of and below block 280 is a block 282 which represents the mechanism described above and shown in Figure 5 for positioning the cross slide including the lead screw 121, the half nut 120, clutch 132 and associated gearing. The connection between the positioning mechanism and the cross slide is represented diagrammatically in Figure 14 by the line 284. The block 280 has attached to it a block 288 representing the plane grating 235 attached to the cross slide 51. (The block 280 also represents the carriage 22 which has no grating.) The drum grating 225 is represented in Figure 14 by block 290 which is interconnected to the cross slide grating block 288 by line 292 representing the optical system described above. In Figure 14 block 294 represents the differential gear assembly illustrated in detail in Figure 6. The cylindrical grating is shown in Figure 6 as mounted on the output shaft 168 of the differential gear assembly. Shaft 168 is represented in Figure 14 by the line 296 connecting block 294 with 290. Returning to block 282 of Figure 14, I show line 298 connecting the line 284 to the differential represented by block 294. The other input to the differential which in Figure 6 comes through the worm 187 is represented in Figure 14 by line 300, which connects to block 302 representing the servo motor 195 of Figure 6. The servo motor represented by block 302 is energized from a photocell output amplifier represented by block 204 which is responsive to the difference in illumination falling upon the photocells 257 of Figure 6 represented by block 306 of Figure 14. Line 303 connecting blocks 304 and 302 represents the electrical connecting cable between amplifier 304 and servo motor 195 of block 302; line 305 connecting blocks 306 and 304 represents the electrical connection between the photoelectric cells 257 and the servo amplifier represented by block 304. Line 307 connecting block 290, which represents the cylindrical grating, with block 306, represents the light beams transmitted through the gratings 225a and 225b and directed by prisms 255a and 255b to the photocells 257a and 257b.

Servo motors, servo amplifiers, photoelectric cells and amplifiers are well understood in the art and I therefore do not show them in detail since to do so would so complicate Figure 14 as to make it very much more difficult to understand. Each electrical block will, of course, be powered in any practical manner known in the art. However the functional cooperation of the various elements shown in block form is described as follows, where I shall explain in terms of the part of Figure 14 so far described how the cylindrical grating 225 is maintained in the proper synchronism with the image of the plane grating 235 as shown in Figure 4. Assuming as a convenient starting point for the explanation that the cross slide (block 280) and consequently the cross slide grating (288) is moving with constant velocity produced by the rotation of the lead screw (included in block 282), as the lead screw rotates it causes a simultaneous rotation of one of the input members of the differential (block 294). If the servo motor (block 302) is stationary then the output shaft of the differential (line 296) rotates at a speed very nearly the same as the rotational speed of the lead screw, differing therefrom only by the imperfections or deflections in the interconnecting members. This result arises from the fact previously described that the gear ratio from the lead screw into the differential is chosen to give an overall 1 to 1 ratio between lead screw and differential output. Now in the numerical example cited above, I noted that a travel of one-tenth of an inch of the cross slide corresponds to one revolution of the drum grating. I have just shown that one revolution of the lead screw also corresponds to one revolution of the drum grating. Therefore the pitch of the lead screw in the example chosen must be one-tenth inch, and it is clear that if all the parts were mechanically perfect and there were no deflections in the system then the drum grating would remain constantly perfectly synchronized with the image of the plane grating, assuming the servo motor (block 302) to be stationary. Consider now the effect of rotation of the servo motor 195 (block 302) when the lead screw (block 282) is stationary. Rotation of said servo motor acting through line 300 causes a rotation of the second input number of the differential (block 294), thus producing a rotation of the drum grating. But the servo motor (block 302) is caused to move by application of a voltage from the servo amplifier block 304 which in turn is responsive to differences in illumination falling upon photocells (block 306). Thus if the pattern of the bright bands (as shown in Figure 4) divides precisely 50-50 on the patterns of the cylindrical grating 225 there is no difference in illumination on the photocells 257 and consequently the servo motor does not move. However, as soon as a difference in illumination on the photocells 257 occurs, a signal is applied to the servo amplifier (block 304), thence to the servo motor (block 302) which, driving through the differential (block 294) causes the drum grating (block 290) to rotate in such a direction that the condition of equality of the two light beams falling upon the photocells is restored.

In actual operation both of the above described actions occur continuously and simultaneously, that is to say as the lead screw rotates the cross slide moves, the drum grating under the urging of input 298 to the differential rotates almost in synchronism with the image of the cross slide grating, and any errors in synchronism that occur cause the drum grating error compensating servo motor (block 302) to rotate in one direction or the other to restore the condition of balance and maintain synchronism as is desired.

The shaft 168 represented by line 296 in Figure 14 of the drum grating (block 290) is connected to the shaft 219 of the precision potentiometer 220, the connection being represented in Figure 14 by the line 312. The shaft of the drum grating is also connected through step-down gearing (200, 201, 205) represented by block 314 and line 315 to the other precision potentiometer 210, the connection between the step-down gearing (block 314) and the precision potentiometer 210 being represented in Figure 14 by line 316. These lines 312 and 316 are continued on Figure 13. Precision potentiometer 210 is for convenience a multi-turn type consisting of a helically wound wire wound into a helix which is readily available commercially. Precision potentiometer 220 is a single-turn type consisting of a helically wound wire but into a circular arc having two wiper arms angularly positioned 180 degrees apart; it too is readily available commercially.

Referring to the circuit connected to the potentiometer 210 which is near the upper right hand corner of Figure 13, this circuit constitutes a resistance bridge of the Wheatstone type which is used to control the approximate or rough positioning action of the cross slide, for which motive power is supplied by servo motor 129 of Figure 5. The points numbered 320, 321, 322 and 323 are the four junction points of the Wheatstone bridge. Arms 321—320 and 320—323 are incorporated in precision potentiometer 210. Arms 321—322 and 322—323 comprise resistances inserted by the stepping switch contact banks 331, 332, 333, 341, 342 and 343. Contact banks 331 and 341 are members of one stepping switch the selector bank of which is numbered 351. Contact banks 332 and 342 are members of another stepping switch the selector bank of which is 352. There are additional selector banks 353, 354 and 355. The contact banks 333 and 343 are members of another stepping switch which also has contact banks 363 and 373, and having selector bank 353. (There are additional contact banks 364, 365, 374 and 375 to be dealt with hereinafter.) Referring now to contact bank 331, which has eleven contacts, I call the individual contacts thereon 0, 1, 2, 3, 4, 5, 6, 7, 8, 9 and 10 numbering counterclockwise as shown. Contact bank 332, having ten contacts, is numbered similarly to bank 331 but only up to 9. Likewise contact banks 341 and 351 are identical to 331, whereas each of contact banks 333, 342, 343, 363, 373, 352 and 353 is identical with 332. Connected between the terminals of adjacent contacts of contact banks 331, 332, 333, 341, 342 and 343 are resistors of equal value for a given bank except as hereinafter noted. Note that there are no resistors connecting the contacts of contact banks 351, 352, 353, 354 and 355, which are used as selector banks. Other elements in the bridge, whose terminals are 320, 321, 322, 323, are resistor 376, variable resistor 377, and variable resistor 378. The function of resistors 377 and 378 which are of very low resistance, such as one ohm, is merely to balance the bridge initially to compensate for small differences in the resistance of the various lead wires and their presence will be ignored in the balance of this discussion.

The value of resistance connected between the individual terminals of contact banks 333 and 343 are the same as the resistance of resistor 376, for illustration that may be one ohm. The resistors which are connected between the terminals of contact banks 332 and 342 are precisely 10 times as high in resistance as resistor 376, for example 10 ohms. The resistors connected between the terminals of contact bank 331 and 341 are each 100 times as large in resistance value as resistor 376, for example 100 ohms each, except that between terminals 9 and 10 of contact bank 331 there is no resistor, but terminal 10 is connected to the right hand side of resistor 376 as shown. Examination of the circuit included between terminals 320, 321, 322 and 323 shows that a value of resistance is inserted in bridge arm 322—323 equal to the sum of the individual resistances selected by the position of the wiper arms on contact banks 341, 342 and 343.

For example in the position shown and with the values for the individual resistors used above for illustration, contact bank 341 contributes 900 ohms, bank 342 contributes 30 ohms, contact bank 343 contributes 3 ohms which gives a total resistance in arm 322—323 of 933 ohms.

The resistance introduced in arm 321—322 by contact banks 331, 332 and 333 is likewise determined by the position of the wiper arms of the respective banks. Tracing the circuit in the position of the wiper arms shown will reveal a total resistance consisting of one ohm from resistor 376, six ohms from contact bank 333, sixty ohms from contact bank 332 and zero ohms from contact bank 331 giving a total resistance in this arm of the bridge of sixty-seven ohms. It should be noted that the sixty-seven ohms introduced by the contact banks 331, 332 and 333 into the upper bridge arm is the complement of one thousand of the resistance introduced in the lower bridge arm by the contact banks 341, 342 and 343.

Continuing the example, let it be assumed that potentiometer 210 has a winding resistance of 1,000 ohms. I have shown how the shaft of potentiometer 210 is driven through the gearing represented by block 314 in such a way that its angular position corresponds linearly to the cross slide position. The shaft 206 of the potentiometer has thereon a wiper arm 380, Figure 13. I assume for the sake of this illustrative example that the total range of motion of the cross slide table is 10 inches, and therefore travel of wiper arm 380 from one extreme end of the winding of potentiometer 210 to the other extreme end of said winding occurs when the cross slide table moves from one extreme end of its travel to the other, namely a distance of 10 inches. In Figure 13 I choose to let the lower end of the winding of potentiometer 210, that is to say the end of the winding nearest bridge terminal 323, correspond to that position of the cross slide which carries the grinding wheel spindle 50 into closest proximity to the operator standing in front of the machine. In the bridge circuit I ground terminal 323 and supply a bridge excitation potential to terminal 321 diagonally opposite it. When the wiper arm 380 of potentiometer 210 is in the zero or lowest position, then the bridge (terminals 320, 321, 322, 323) will be in balance (no voltage appearing across terminals 320 and 322) only if the resistance in bridge arm 322—323 is equal to the resistance remaining in bridge 320—323 and if the resistance in bridge arm 321—322 is equal to the resistance in bridge arm 320—321. It may be seen that when the wiper arms of contact banks 341, 342, 343 are in the maximum clockwise or zero position, there are zero ohms introduced into arm 322—323 of the bridge just as no resistance from potentiometer 210 is introduced into arm 320—323 when the wiper is at the position stated. Thus potentiometer 210 places its entire winding resistance or 1,000 ohms into arm 320—321. At the same time that the wiper arms of contact banks 341, 342 and 343 are in their numerical zero positions so also are the wiper arms of contact banks 331, 332, 333. Tracing the circuit from terminal 321 through resistor 376 through contact bank 333 through contact bank 332 through contact bank 331 reveals that there has been introduced one ohm from resistor 376, nine ohms from contact bank 333, ninety ohms from contact bank 332 and nine hundred ohms from contact bank 331, which in series connection places one thousand ohms in bridge arm 321—322. Therefore the bridge is in balance when the cross slide is in its maximum forward position and the selector banks 351, 352, 353 have caused their respective stepping switches (by circuits yet to be described) to move to the positions labeled zero in Figure 13.

Now consider the condition of balance when wiper arm 380 is at the upper end of the winding of potentiometer 210, that is when the cross slide is in its position of maximum retraction, that is to say is withdrawn 10 inches from its maximum forward position. The bridge is balanced under this condition if the resistance introduced into arm 321—322 is zero ohms and if the resistance introduced into arm 322—323 is 1,000 ohms. When the wiper arms of contact banks 331, 341 and their selector bank 351 are in the 10 position (full counter-clockwise) and when the wiper arms of contact banks 332, 342 and their selector bank 352 and contact banks 333, 343 and their selector bank 353 are in the numerical zero or full clockwise position, the condition stated above holds.

Next and still by way of illustration, let it be assumed that the cross slide is in a position 9.33 inches back from its full forward position. Then wiper arm 380 of potentiometer 210 will be located near the upper end of the winding of potentiometer 210 in Figure 13, and by virtue of the linear relationship which exists between cross slide position and wiper arm position as discussed above, there will in fact be very nearly 933 ohms inserted in bridge arm 320—323 and 67 ohms inserted in bridge arm 320—321 when the potentiometer wiper arm 380 is so positioned. Thus the condition for balance in the bridge circuit under these circumstances requires that 67 ohms appear in bridge arm 321—322 and 933 ohms appear in bridge arm 322—323. Tracing the circuits in the first instance through resistor 376, contact bank 333, contact bank 332 and contact bank 331, and in the second instance through contact banks 343, 342 and 341, reveals that these are the values of resistance inserted in the respective bridge arms for the position of the wipers as shown in Figure 11.

In these three examples I have have demonstrated the positions which must be assumed by the wiper arms of the stepping switch contact banks in order to balance the bridge for three given positions of the wiper arm 380 of potentiometer 210. In each of these cases it was seen that if a decimal digit number is constructed by choosing as the least significant digit the number of the terminal contacted by the wiper arm of contact bank 343, then choosing for the next more significant digit (that is the digit falling to the left of the first digit) the number of the contact contacted by the wiper arm of contact bank 342, and for the next more significant digit (that is the digit falling to the left of the two previously chosen) the number contacted by the wiper arm of contact bank 341, placing the decimal point between the second and third so chosen digits, then the decimal digit number so formed represents the position in inches of the cross slide. Therefore I have provided a mechanism by means of which a decimal digit number corresponding to a desired position of the cross slide member of the grinder may be compared with the actual position of the cross slide in such a way that any difference between the two is shown by a voltage appearing between the output terminals 320—322 of the bridge circuit described. The polarity, or phase, of this unbalanced voltage is determined by the sense of the positional difference between the actual and desired positions of the cross slide; if the cross slide is forward of the desired position the voltage is of one polarity, while if the cross slide is behind the desired position the voltage is of opposite polarity.

The operation of the automatic positioning system follows immediately. Referring to Figures 14 and 13, block 385, connected to terminals 320 and 322 of the bridge by lines 382 and 383, represents a servo amplifier responsive to unbalance voltages developed by the bridge circuit 320, 321, 322, 323. Block 385 is connected to armature 387 of the servo motor 129 of Figure 5, through lines 386. Lines 386 are interrupted by normally open series contacts 390 of relay 392; armature 387 is connected to block 282 by line 388 representing the servo motor output shaft. Block 394 represents a sensitive amplifier which causes relay 392 to operate in response to to output voltage of the amplifier represented by block 385, interconnection between the two being represented by lines 395. The amplifier represented by block 394 is adjusted so that when the output voltage from the amplifier represented by block 385 is larger than that corresponding to the voltage produced by a bridge unbalance greater than one or two ohms, the relay 392 is energized. When the output voltage of the amplifier represented by block 385 is smaller than this amount, relay 392 is deenergized and drops out. Lines 396 of Figure 14 represent an interconnection from the amplifier system represented by block 394 to the electromagnetic clutch represented as a portion of block 282 and shown as 132 in Figure 5 the clutch being so constructed that when the bridge unbalance voltage exceeds the above mentioned limits, the clutch 132 is disconnected.

To bring together the ideas of the functions of the various elements described so far, consider the action of the system if the cross slide is initially situated at its position of maximum retraction (10.00 inches) and the stepping switches are instantaneously placed in the positions shown in Figure 13 calling for the cross slide to move to the 9.33 inch position. The unbalanced voltage developed across terminals 320—322 of the bridge is amplified in block 385 causing relay 392 to complete a circuit from the amplifier 385 to the coarse positioning servo motor 387. The servo motor armature 387 drives the lead screw (121 of Figure 5) at a relatively rapid rate of rotation in such a direction as to reduce the degree of unbalance of the bridge circuit. As the cross slide moves the drum grating driven partly by the rotation of the lead screw and partly by the rotation of the servo motor 195 of block 302 which maintains synchronism between the drum grating and the image of the cross slide grating follows accurately the momentary position of the cross slide, thereby moving the wiper arm 380 of potentiometer 210 in close synchronism with the motion of the cross slide. As the balance point is approached the unbalanced bridge voltage diminishes, the amplified signal applied to the servo motor 387 is reduced and depending upon the particular design of the compensating circuits of the amplifier of block 385, the cross slide will approach without overshoot or will overshoot and hunt slightly at the balance point 9.33 inches. In Figure 14 I indicate a field winding 389 for the servo motor whose armature is 387. This field winding 389 can be continuously energized by suitable power.

The accuracy with which the cross slide is positioned by the system described thus far is limited primarily by the precision of potentiometer 210 and the resistors which are employed in the wiring of the contact banks 331, 332, 333, 341, 342 and 343. Potentiometer 210 may conveniently be a precision helical potentiometer; these are commercially available with accuracies such that the resistance between wiper arm 380 and one end terminal varies from a linear relationship with respect to shaft angle by as little as .025%. If in this case I choose a potentiometer 210 having a linearity tolerance of 0.1%, that is one part in one thousand, then for a total range of motion of 10 inches corresponding to the complete rotational range of the potentiometer the error introduced by non-linearity of the winding is ten thousandths of an inch or less. If the bridge resistors used in the stepping switch contact banks are chosen with a similar tolerance, then the maximum positioning error introduced by these sources is of the order of 20 thousandths of an inch. Since these errors are larger than can be tolerated in a precision machine tool, I provide two stages of control in my mechanism including the coarse positioning control which I have described above and which is capable of locating the cross slide within approximately 20 thousandths of the final desired position. In addition to this control I provide a second stage of control called the fine positioning control which takes over from the coarse positioning control when relay 392 responsive ultimately to the degree of unbalance of the bridge circuit 320, 321, 322, 323 drops out indicating that the coarse positioning control has carried the slide to a point within the tolerance zone of this control.

The fine positioning control consists of a Wheatstone bridge similar to that described above, and represented in Figure 13 by terminals 400, 401, 402, 403. In this bridge circuit contact bank 363 plays the part of contact bank 331 of the previous bridge circuit. Contact bank 364 plays the part of 332, 365 the part of 333, 373 the part of 341, 374 the part of 342, 375 the part of 343. Resistor 405 plays the part of resistor 376, variable resistor 410 plays the part of variable resistor 377, variable resistor 411 plays the part of variable resistor 378. The values of resistance connected between adjacent terminals of the contact banks 363—365 and 373—375 may conveniently be of the same values as those used in the connection described above. Selector banks 354 and 355 are used to position the wiper arms of contact banks 374 and 364, 375 and 365 respectively, and selector bank 353 is used to control the position of the wiper arms of four contact banks 333, 343, 363 and 373 actuated in parallel. The circuits of the selector banks will be described later.

The difference between the circuit of the fine positioning Wheatstone bridge 400, 401, 402, 403 and the coarse positioning Wheatstone bridge 320, 321, 322, 323 arises from the use of a single-turn precision potentiometer 220. This I selected (choosing the same numerical example) because one turn of the shaft of potentiometer 220 corresponds to a motion of only one tenth of an inch of the cross slide. Since the cross slide has a range of travel of ten inches, potentiometer 220 must make one hundred revolutions for one complete transit of the cross slide. No multi-turn potentiometer of the required precision or angular range is available. All single-turn potentiometers suffer from a common defect, namely at the ends of the winding there is necessarily a dead zone or gap through which the wiper arm must pass as it rotates continually in one direction to move from the high voltage end of the winding to the low voltage end of the winding and vice versa. In a typical potentiometer this dead zone may be equivalent to several degrees of motion of the shaft. In order to circumvent the difficulty outlined, I use a precision single-turn potentiometer 220 having two wiper arms 415 and 416 spaced 180 degrees apart. Referring to both Figures 12 and 13, I have provided cam actuated switch 110 operating relay 420 whose contact assembly 422 is used in Figure 13 to select that wiper arm of the wiper arms 415 and 416 which is located in the semi-circular portion of the potentiometer winding opposite the dead zone and to connect it to bridge terminal 400. Simultaneously contact assembly 423 of relay 420 is used to insert resistor 425 into the upper or the lower arm 401—402 or 402—403 of the fine positioning bridge to compensate for the resistance offset occasioned in bridge arms 401—400 and 400—403 by selection of the wiper arm as desired. Otherwise the operation of the fine positioning bridge circuit and stepping switch bank is identical with that of the coarse positioning bridge. In Figure 13, lines 430 and 431 connect the output of the fine positioning bridge to block 433 representing the servo amplifier used in conjunction with the fine positioning control system. Lines 434 connect the servo amplifier 433 and a fine positioning servo motor armature 435. The motor of the armature 435 is servo motor 95 of Figures 5 and 11. Line 436 joining armature 435 to block 282 represents the shaft drive connection from the fine positioning servo motor into the lead screw assembly. Lines 434 are interrupted by normally closed contacts 438 of relay 392 so that in the absence of a bridge unbalance signal greater than the predetermined amount from the coarse positioning drive system the fine positioning drive motor is energized from its servo amplifier and the electromagnetic clutch of block 282 is engaged to complete the mechanical connection from the servo motor to the lead screw. The fine positioning servo motor armature 435 connects to the lead screw through the high ratio gear reduction unit described whereby the speed of travel of the cross slide is very much slower when driven by the fine positioning motor than when driven by the coarse positioning motor as is required to effect the necessary fineness of control.

The decimal digit number constructed according to the above rules from the position of the wiper arms of selector banks 365 and 364 give the tenths of thousandths and thousandths digits of the number representing the position in inches of the cross slide when both bridges are in balance. Thus in the positions shown for all contact banks in Figure 13 the equilibrium or balance position of the cross slide is 9.3307 inches.

The servo motor 95 (armature 435 of Figure 14) responds to slight unbalance of the bridge 400 due to the amplification by amplifier 433 down to an unbalance involving a position error of .0001 inch or less. Also the amplifier and servo motor respond to both overshoot and undershoot in such a way that the servo motor drives the system towards the balance point. The construction of servo motors both electrically and mechaically is well understood so I need not further describe them.

Therefore it may be seen that the cross slide may be caused automatically to assume any desired position within its range of travel by rotating the wiper arms of the selector switch assemblies to positions corresponding to the decimal number expressing the desired position in inches, tenths, hundredths, thousandths and tenths of thousandths thereof. The positioning of the stepping switches to the desired contacts is accomplished through selector banks 351 through 355 by means to be described below.

I have described above the mechanism by means of which the cross slide 51 is positioned. The carriage 22 is also positioned in response to input commands in digital form by a mechanism in many respects similar to that described. Since, however, the precision with which it is necessary to position the carriage 22 in the case of the normally encountered application of external cylindrical grinders is not so critical as is the tolerance required in positioning the wheel slide, I have omitted from the mechanism illustrated in Figure 7 the optical system and its associated mechanisms, choosing instead to drive the coarse and fine positioning potentiometers, numbers 105 and 100 respectively in Figure 7, directly from the feed screw 66 by means of appropriate gearing. I thus rely on the accuracy and stiffness of lead screw 66 and nut 65, an accuracy which for carefully made machine parts may be of the order of a few thousandths of an inch in a travel of several feet, for positioning carriage 22. Furthermore in Figures 13 and 14, while the function of coarse and fine positioning servomotors, coarse and fine bridges, precision potentiometers and stepping switches is identical for the control of the position of carriage 22 as it is for the control of the cross slide circuit, because of the non use of addition mechanism, I connect the wiper arms of the contact banks 365 and 375 directly to a knob 445 (see Fig. 1) to control to thousandths of an inch; the wiper arms of the banks 364 and 374 to a knob 444 to control to hundredths of an inch; the wiper arms of the banks 333, 343, 363, and 373 to a knob 443 to control to tenths; the wiper arms of banks 332 and 342 to a knob 442 to control to inches; and the wiper arms of banks 331 and 341 to a knob 441, to control to tens of inches. Thus in the embodiment represented by Figures 13 and 14 modified as illustrated in Figure 15, the total range of motion of carriage 22 within the limits of the control circuit for the numerical example employed is 100 inches. Extension of the controls described to shorter or longer ranges of motion can readily be achieved.

Referring now to Figure 15, which represents a modification of Figure 14 and illustrates the simple changes for controlling the carriage 22 instead of the cross slide 51, I first note that the entire left hand column of blocks of Figure 14 is omitted. This includes 288, 290, 294, 306, 304 and 302 and all of the connecting lines. Block 280 becomes the carriage 22. Block 314 of Figure 14 becomes a pair of blocks 314a and 314b representing gears 97 and 98 for 314a and 102 and 103 for 314b. The lead screw 66 of block 282 drives the carriage 22 represented by block 280, the drive being shown in Figure 15 by line 284a and shunt line 298a represents the connection between lead screw 66 and gear 97. The gearing of block 314a drives the gearing of block 314b, as represented by line 315a. Block 314a drives, as indicated by line 312a, the potentiometer 100 of Figure 7, equivalent to 220 of Figures 6 and 13, and block 314b drives, as indicated by line 316a potentiometer 105 of Figure 7, equivalent to 210 of Figures 6 and 13. Of course there are in the machine two complete sets of potentiometers, stepping switches, servomotors, amplifiers, etc. The lines 312a and 316a of Figure 15 should be read as lines 312 and 316 respectively of Figure 13, and, for the carriage control, potentiometers 210 and 220 of Figure 13 are potentiometers 105 and 100 respectively.

Referring now to Figures 16 and 17, I shall explain how the selector banks 351 through 355 of Figure 13 are connected to attain proper functioning of the cross slide control. In order to do this, I must first review certain of the requirements of a grinding machine, in particular an external cylindrical grinder, with respect to the wear encountered in the grinding wheel (48 of Figure 5).

Since the grinding wheel wears, as it abrades the surface of any workpiece, at a rate dependent upon the severity of the grinding action, and since the rate of wear may be so high as to require truing or dressing of the wheel as often as once for every few workpieces produced, the control apparatus should provide simple means for truing without disturbing the calibration of the work size control.

Accordingly I divide the input command which directs the cross slide 51 to a position within its range of travel as hereinbefore described into two separate commands, one of which refers solely and exclusively to work radius symbolized hereinafter by "W," and the other of which refers to truing feed symbolized hereinafter as "T." In Figure 5, I show a dashed line 440 on the grinding wheel 48 representing the smallest usable diameter of grinding wheel 48. I call the distance from the actual face of the wheel to the dashed line 440 the truing distance "T." When grinding wheel 48 is in contact with and grinding upon the surface of a cylindrical workpiece located between centers 33 and 34, the distance from the axis of centers 33 and 34 to the nearest point of the surface of the wheel 48 is the work radius shown as "W" in Figure 5. When the workpiece has reached its final size, the cross slide 51 is stationary, and the sum of the values $W+T$ is equal to the decimal digit number represented by the positions of selector banks 351 through 355 of Figure 13. Referring to Figure 1, I show on the front of the base of the machine three rows of knobs, the upper row consisting of knobs 451, 452, 453, 454 and 455 labeled wheel slide, the lower set of knobs 461, 462, 463, 464 and 465 being labeled truing selector. Each of these knobs carries markings as shown in Figure 2 for knob 454, said markings ranging over the values from 0 through 9, except that knobs 451 and 461 carry also the additional marking 10 counter clockwise beyond 9. These markings are set against an index point 470 which is stationary with respect to the base 21. By means of knobs 451 through 455 and tap switches associated therewith (to be described below in connection with Figures 16 and 17), I introduce into the control system the decimal digit number corresponding to the work radius W, while with the row of knobs 461 through 465, I similarly introduce the decimal digit number corresponding to the remaining usable wheel radius T. The circuits of Figures 16 and 17 are designed to perform the addition function $W+T$ which is used to control the positions of selector banks 351 through 355 of Figure 13.

The control knobs 441 through 445 control the carriage and are on the shafts of the contact bank wiper arm shafts as previously indicated. Of course in the machine there are two of each contact bank of a given number and two of all of the associated electrical apparatus except as indicated.

The control knobs 451 through 455 and 461 through 465 are used in the following manner: assume that a brand new wheel 48 has been placed on the machine, that the cross slide 51 is in its position of maximum retraction, that the truing diamond 46 is at a definite and known distance from the axis of the centers 33 and 34, for example 2.0000 inches. Further let it be assumed that the tip of the diamond 46 is always in the plane containing the axis of the wheel spindle 50 and the axis of the centers 33 and 34, also that the adjustment of the plane grating 235 and the control circuit of Figures 13 and 14 has been made such that when all the selector banks 351 through 355 are in their zero position, that the line 440 of Figure 5 representing the smallest size the wheel is permitted to attain coincides exactly with the axis of centers 33 and 34. Then with the new wheel 48 in place on the spindle 50, I set the W value on the wheel slide control knobs 451 through 455 equal to the distance from the tip of diamond 46 to the axis of centers 33—34, 2.0000 inches. Starting with the truing selector control knobs 461 through 465 set for a large value, I gradually reduce the number represented by the setting of said control knobs, thus gradually feeding the cross slide forward toward the diamond until the surface of wheel 48 just makes contact with diamond 46. I then true the wheel in this position of the cross slide 51 (as by turning knob 562 to be described) adding further increments of infeed by adjustment of the tenths of thousandths or thousandths knob 465 or 464 until the wheel surface is satisfactory. I then leave the setting of the control knobs in the truing selector row at this value while I proceed to grind workpieces to various radii determined by the settings I introduce through the wheel slide control knobs 451 through 455.

When, for example by measuring the radius of workpieces coming from the machine, I determine that the wheel is in need of truing, I reset the wheel slide control knobs 451 through 455 to the 2.0000 inch figure, changing the truing selector control knobs to a sufficiently lower value to carry the wheel into the diamond by one or two thousandths of an inch or whatever may be required for the truing operation. This cycle may be repeated until the wheel has been reduced in diameter to such an extent that its size coincides with line 440 of Figure 2 which will be obvious because at that time the setting of the truing selector knobs will be 0.0000. With repeated truing operations the diamond 46 will itself be worn. Compensation for diamond wear may be accomplished either by manually advancing the diamond by means of adjustable holder 45 or by reducing the radius value set in the wheel slide control knobs 451 through 455 when truing to correspond to the actual radius from the axis of centers 33—34 to the tip of diamond 46 which may be determined from micrometer measurement of the first workpiece produced after truing.

In Figures 16 and 17 I show means for performing the addition function $W+T$. Referring first to Figure 16, I provide a positive bus bar for a digit of the truing control 500. I further provide a positive bus bar for a digit of the work size control 502. In each case the wiring of Figure 16 applies only to the last digit, the bus bar 500 being for the dial 465 and the bus bar 502 being for the dial 455 and the entire diagram of Figure 16 is for the selection and implementation of the last digit.

I provide further a positive bus bar 504 for the relays of the truing control. I provide a positive bus bar 506 for relays of the work size control and another positive bus bar 508 for further relays of the work size control. I provide one negative bus bar shown as connected to ground 501 for the truing control relays and negative bus bars shown connected to ground 503 and 505 for the work size control.

The tap switch contacts for truing are designated 510 and the tap switch contacts for work size control are designated 512.

I provide isolating truing control carry-over relays 513, isolating work size control carry-over relays 515 and chain wired work size control carry-over relays 517. I provide a stepping switch for the addition comprising a selector bank 520 and contact banks 522. These are mechanically parallel, that is to say their wiper arms are on a single shaft represented by the dash line 524.

I provide connecting wires 525 between the isolating control relays 513 and the chain wired relays 517. I provide connecting wires 527 between the tap switch contacts 512 and the wiper arms of contact banks 522. I provide connecting wires 531 between the tap switch contacts 512 and the relays 515. I provide connecting wires 535 between the contacts of the isolating relays 515 and the chain wired relays 517. I provide addition wiring 540 from the contact banks 522 to the selector bank 355 which has been previously identified.

I provide a carry-one bus bar 550 which carries over to the wiring diagram of Figure 17 whenever the sum of the digits for truing and work size equals ten or more. I provide wiring 551 shown as cable from the tap switch contacts 510 to the selector bank 520. I further provide connecting wires 553 from the tap switch contacts 510 to the isolating relays 513.

Referring now to Figure 17, the wiring is similar although there are additional features. Without repeating the foregoing description it will suffice to say that the same elements to wit, bus bars, tap switch contacts, relays, stepping switch comprised of selector bank and contact banks, connecting wires, and carry-one bus bar are found in Figure 17 with the same numbers except that they are in the 600 series, for example the isolating work size control carry-over relays are numbered 615 instead of 515.

Selector bank 355 shown at the upper right hand corner of Figure 16 is selector bank 355 of Figure 14.

A stepping switch may be caused to step continually until the wiper arm of its selector bank strikes a contact which is connected externally to the positive side of the power source. In Figure 16 referring to selector bank 355 having contact points labeled 0 through 9 counterclockwise, relay coil 700 actuates normally closed contact 701 whenever the wiper arm 702 of selector bank 355 touches a contact which is energized from the positive side of the source, thus completing a circuit through the coil of relay 700 to ground as shown. When the coil of relay 700 is energized contact 701 is opened.

Magnet 705 is the stepping magnet of the stepping switch whose selector bank is 355. Magnet 705 is electrically energized through contact 706 and contact 701 connected in series with the positive side of the power supply at conductor 707, the other terminal of the coil of magnet 705 being grounded. Contact 706 is the interrupter contact of the stepping switch whose selector bank is 355, and is mechanically actuated by the rotational movement of the armature shaft bearing wiper arm 702 in such a way that the magnet 705 is cyclically energized causing the wiper arm assembly to step from contact to contact. That is to say this wiper arm never has to be reset, on the contrary when it reaches 9 it steps around until it reaches 0 again. It is immaterial how many steps there are between 9 and 0 because it will keep on moving until it finds a numbered contact for it can only stop at a numbered contact depending upon the circuit of conductors 540. The stepping action of magnet 705 is halted when relay 700 is energized opening contact 701 and removing the power from the circuit of the magnet 705. Thus when the wiper arm 702 reaches an energized contact it halts at that point. In referring to specific tap switches and relays and other parts from now on when it is necessary to be specific, I shall use the numbers hereinbefore given representing a collection of the parts followed by a hyphen and a number from 1 to 0 or 9 as the case may be representing the particular unit involved and it can be seen that in Figures 16 and 17 the digit numbers are given at the left hand side.

As has been described above, the tap switch contacts 510 are controlled by knob 465 of Figure 1, that is to say for each position of knob 465 one of the contacts of the group 510 will be closed and all the others will be opened. Similarly the contacts of group 512 are actuated by knob 455 in such a way that for each position of the knob one and only one of the contacts 512 is closed. I shall now show that the action of the circuit of Figure 16 is to energize that contact of selector bank 355 which corresponds to the right hand digit of the decimal number which is the sum of the designating number of the closed contact of contact group 510 plus the designating number of the closed contact of group 512. By way of illustration, I close contact 4 of group 510, that is contact 510—4, and contact 3 of group 512, that is contact 512—3. Tracing the circuit from 510—4 the positive bus 500 is connected through the contact 510—4, through cable 551, to contact point 4 of selector bank 520. Selector bank 520 is identical in construction to selector bank 355, and its associated stepping magnet 710 and stopping relay 711 act in identically the same manner as stepping magnet 705 and stopping relay 700 causing the wiper arm 712 of selector bank 520 to stop on contact 4. Because of the parallel connection of the wiper arms on shaft 524, all the wiper arms of contact banks 522 are also positioned on contact 4. It is to be understood that the cable 551 signifies a bundle of conductors insulated from each other each connected at one end to one contact point of selector bank 520 and at the other end to the like numbered right hand terminal of tap switch contact bank 510.

In tap switch contact group 512 closing contact 512—3 completes a circuit from the positive bus 502 through conductor 527—3 to the wiper arm of contact bank 522—3 which as hereinbefore described completes a circuit to the fifth contact (equivalent to contact point 4 in selector bank 520) and thence by way of a conductor 540 to contact point 7 of selector bank 355, causing the stepping switch of which selector bank 355 is a part to step to position 7 under the action of stepping magnet 705 and stopping relay 700 as desired. This also positions the wiper arms of contact banks 375 and 365 of Figure 13 in position 7, which is seen to correspond with the sum (3+4) of the digits represented by the closed contacts 510—4 and 512—3 which were chosen by the knobs 465 and 455 of Figure 1.

In the foregoing example the sum of the two digits (3+4) is a single digit (7) and the process of addition of the next digits of the W and T numbers does not include a carry-over from the summing of the first two digits. To illustrate the operation of the circuit of Figure 16 in the event that a carry-over is generated on the first addition, consider the situation when the right hand digits of the W and T numbers as inserted by means of knobs 455 and 465 are 9 for T and 8 for W, that is contacts 510—9 and 512—8 are closed while all other contacts of the group 510 and 512 are open. Closure of contact 510—9 connects the positive bus 500 through cable 551 to contact point 9 of selector bank 520 causing the stepping switch of which selector bank 520 is a part of step to position 9. Also closure of contact 510—9 connects the positive bus 500 through conductor 553—9 to relay 513—9 energizing that relay. Closure of contact 512—8 connects positive bus 502 through conductor 527—8 to the wiper arm of contact bank 522—8, this wiper arm having been positioned in its maximum clockwise location by the action of selector bank 520. The positive bus 502 is thereby connected through one of the conductors 540 to contact point 7 of selector bank 355. Energization of contact point 7 of selector bank 355 corresponds to the right hand digit 7 of the sum (9+8=17) of the two numbers introduced through tap switch contacts 510—9 and 512—8. Unlike the previous case, there is in this case a one carry-over which must be added in with the W and T digits of the next more significant decimal position.

The circuit of Figure 16 is arranged to generate the necessary carry-one command to the next stage by making use of the following principles. When two digits each of which vary over the range from 0 through 9 are added, a carry-one command must be generated if the sum exceeds 9. If one of the digits is 0 the sum can never exceed 9 and no carry-one command will ever be required. If one of the digits is 1, then a carry-one command is required only if the other digit is 9. If one of the digits is 2, a carry-one command is required if the other digit is either 9 or 8, and so forth. The chain wired relays 517 in the W control circuit of Figure 16 perform this logical "either-or" function.

When contact 512—0 is closed, the only effect is to transmit a positive signal through conductor 527 to the wiper arm of the contact bank 522—0; no carry command ever being required in this case, no relay 517 is included in this circuit.

Closure of contact 512—1 connects a positive signal to the wiper arm of the contact bank 522—1 and also energizes relay 515—1, the other terminal of the relay coil of 515—1 being connected to ground bus 503. Energization of relay 515—1 closes its normally open contact thus connecting positive bus 502 through conductor 527—1 to coil of relay 517—1; relay coil 517—1 energized closes its normally open contact connecting the conductor of 525 which connects to the normally open contact of relay 513—9 to the carry-one bus 550. If then contact 510—9 should be closed relay 513—9 is energized closing its normally open contact which connects the positive bus 504 to the conductor 525 which places the positive signal upon the carry-one bus 550 through the contact relay 517—1.

If any contact of group 510 other than 510—9 is closed, relay 513—9 remains deenergized, its contact remains open and no positive signal appears on the carry-one bus 550. Thus if 512—1 is closed, only the closure of 510—9 generates a carry-one command.

Consider now the situation when 512—2 is closed. Relay 515—2 is energized directly, closing its normally open contact which energizes relay 517—2. Energization of relay 517—2 closes its normally open contacts one of which through the agency of a conductor 525 performs a role identical with that of the contact of relay 517—1 in conjunction with a conductor 525, only with respect to relay 513—8 instead of 513—9; thus when contact 512—2 is closed, if contact 510—8 is also closed, a positive carry-one signal appears on the carry-one bus 550.

I also provide a carry-one signal when contact 512—2 is closed in the event of closure of contact 510—9 by means of the second normally open contact of relay 517—2, which connects the positive bus 508 attached to its right hand terminal to conductor 535—1, energizing relay 517—1. Thus when contact 512—2 is closed both relays 517—2 and 517—1 are energized. When relay 517—1 is energized a carry-one signal appears on the bus 550 in the event of closure of contact 510—9 and a carry-one signal also appears on bus 550 in the event of closure of 510—8 when 517—2 is energized. Thus in the case of closure of 512—2 a carry-one signal is generated for closure of either 510—8 or 510—9. In like manner closure of contact 512—3 energizes relay 515—3 which energizes relay 517—3 in the same manner of action as relays previously described. Closure of relay 517—3 through chain wiring closes relay 517—2 in the same manner that 517—2 closes 517—1 when 517—2 is energized. Thus closure of contact 512—3 energizes all three relays 517—3, 517—2 and 517—1; consequently if any of the contacts 510—7, 510—8 or 510—9 is closed concurrently with closure of contact 512—3, a positive carry-one signal appears on the carry-one bus 550. By tracing the various connections shown it may be verified that a similar action takes place for all other combinations of closure of contacts 510 and 512.

Since the sum of the two largest digits which may appear on the knobs 465 and 455 of Figure 1 is (9+9=18), the necessity for a carry signal representing a digit larger than one can never occur. Thus the single carry-one bus 523 is the only carry connection required between the circuits of the stepping switches represented by selector banks 355 and 354 of Figure 13.

Since the largest sum which can occur from the digits of any pair of selector knobs such as 454 and 464, 453 and 463, and so forth, is (9+9=18) and since the largest carry-over from the least significant position (knobs 455 and 465) is one, the largest sum which can occur anywhere is 19, and consequently there never arises a need for a carry-over larger than one between any of the stepping switches represented by the selector banks 354, 353, 352 and 351 of Figure 13.

The circuit associated with selector bank 354, that is the circuit of Figure 17, is identical with that of Figure 16 with the exception of provision for adding in the carry-one command which may arrive on bus 550. Referring to the lower left hand corner of Figure 17, connected to carry-one bus 550 is the coil of relay 760, the other end of the coil being grounded. Relay 760 has a plurality of contacts arrayed along dash line 761, contact 762 being normally open, and contacts 763 above it being single pole double throw with normally closed contacts above the normally open contacts. Conductors 780 join the right hand sides of the normally open contacts of each contact 763 with the right hand side of the normally closed contacts of contact 763 directly below it.

In the upper right hand corner of Figure 17, selector bank 354 (also shown in Figure 13) is shown actuated by stepping magnet 805, interrupter contact 806, stopping relay 800, and stopping relay contact 801, its wiper arm being numbered 802. Similarly stepping magnet 810 and stopping relay 811 actuate the stepping switch whose selector bank is 620.

In the case of contacts 612—0 through 612—8, the carry-one command is used to make the digit represented by the number of the contact appear one larger than the number inserted on the control knob 454 of Figure 1. For example, assume contact 612—2 to be closed. Assume also that bus 550 contains a carry-one signal; 550 being positive with respect to ground, relay 760 is energized thus closing the normally open contacts and opening the normally closed contacts of 763—2 connected to contact 612—2. Thus the positive signal from bus 602 passing through closed contact 612—2 is carried through the normally open contact of contact 763—2 to conductor 780—2 and thence to conductor 627—2. Thus although I have closed contact 612—2, it appears to the circuit lying to the right of conductor 780—2 as though contact 612—3 had been closed, thus effectuating the carry-one operation.

On the other hand if no carry-one signal appears on bus 550, then relay 760 remains deenergized, thus the normally closed contact of 763—2 remains closed. Should contact 612—2 be closed under these circumstances the positive bus is connected directly to conductor 627—2 and the circuit responds in the normal manner, that is similarly to the response of the circuit of Figure 16.

In the circuit of Figure 17, conductor 650 performs the same function that conductor 550 performed in the circuit of Figure 16, that is conductor 650 collects carry-one commands for the next stage to the left.

The circuit associated with contact 612—9 differs from the circuits of contacts 612—0 through 612—8 for this reason: if a carry-one signal arrives on bus 550 concurrently with the closure of any one of the contacts from 612—0 through 612—8 they are caused to appear like digits one larger by the action of relay 760 as explained, that is it will appear as though one of the contacts from 612—1 through 612—9 is closed. Addition of a digit from bank 610—0 through 610—9 may then proceed with carry-over determined in the same manner as in the circuit of Figure 16. On the other hand if contact 612—9 is closed and a carry-one signal arrives on bus 550, then 612—9 is made to look like closure of 612—0 but since the addition of 1 and 9 always results in the necessity of a carry-one command, I include additionally relay 770 which is energized upon closure of contact 612—9. Relay 760 energized closes normally open contact 762. Thus simultaneous closure of contact 612—9 and energization of relay 550 completes a path from the positive bus 602 through the contact of relay 770 through contact 762 to the carry-one bus 650, thus sending a carry-one command to the next stage regardless of which contacts of the group 610—0 through 610—9 may be closed.

The discussion above is concerned with the detail of the control mechanism used to position the cross slide 51 with due allowance for the fact that wheel wear occurs.

There are four electrical mechanisms constructed in accordance with Figure 17 in the machine, one for each of the selector banks 351, 352, 353 and 354. In each case the bus 550 brings in the carry-one signal and the bus 650 transmits the carry-one signal to the next electrical mechanism except in the case of the one associated with selector bank 351 in which case the bus 650 goes to the number 10 contact of selector bank 351, Figure 13. Of course, the contact bank 354 becomes successively contact bank 353, 352 and 351 and I note that the contact bank 351 as shown on Figure 13 has a 10 position whereas the others end with the 9 position. The connection of 650 bus in the last stage to the 10 position of 351 permits the slide to go to the full 10 inch position whereas otherwise it would have to stop at 9.9999 inches.

For axial positioning of the workpiece 40 (Figure 1) with respect to the wheel 48 by motion of carriage 22 these complications are usually unnecessary and in this case I connect the wiper arms of the contact banks direct to the knots 441 through 445 in the middle horizontal row labeled "carriage" of Figure 1 as previously explained, and of course the way to do this is to have common shafts for the wiper arms and the knobs.

In the claims I refer to the right circular cylinder upon which the gratings 225 are formed as a drum. It should be understood that the linear velocity of the cross slide 51 at any time bears the same ratio to the peripheral velocity of the drum at said time as the ratio of the grating size of the grating 235 to the grating size of the gratings 225. It should be further understood that this ratio is the same as the light magnification multiplier. The cross slide 51 is a movable machine element. The drum on which the gratings 225 are formed is a movable machine element. There is a mechanical connection between these elements to cause one of them to move at the said ratio to the other thereof. One of these elements has thereon a continuous grating, to wit, in this case the grating 235. The other of said elements has a pair of offset gratings 225 in side by side relationship to each other. The optical system is light projecting means which is positioned to produce an image of one of the continuous grating and the offset gratings upon the other thereof of a size which is the above ratio to the image producer. The photocells 257a and b constitute a pair of photosensitive means each of which is positioned to pick up light from one offset grating and from the continuous grating including the image of one of the gratings and an offset grating and between them picking up light from both offset gratings. The foregoing mechanism can take many forms other than that shown and it is useful as position controlling mechanism in many different kinds of apparatus other than that herein illustrated and described. And furthermore in the machine disclosed the shaft 152 (Figure 6) can be locked and the mechanism will still work only the servo motor 195 will have to work hard. Of course in doing so the bevel gear 151 would be removed and naturally the bevel gear 150 would then become useless so it could be removed.

The contact banks with unit resistances between each pair of contacts may be referred to as tap voltage dividing means because for the ohmic resistance system illustrated and described autotransformer mechanisms could be substituted. The system of Figures 16 and 17 constitutes a pair of multi-stage electric mechanisms each one arranged to set up a number in the decimal system together with electric addition mechanism to add the two numbers. The balance of the apparatus is an electric system including a motor to move the slide 51 a definite distance for each unit of the number which is the result of the addition.

It will thus be seen that there has been provided by this invention a micrometric long distance transducer and positioning apparatus in which the various objects hereinbefore set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In apparatus of the class described, a movable machine element, a potentiometer, a pair of gratings the first of which is connected to said movable machine element and the second of which is connected to said potentiometer, a first servo motor and connections to move said machine element, a Wheatstone bridge including said potentiometer, means to unbalance said bridge in a direction so that movement of said potentiometer will restore balance, electric power and connections to the bridge and to the first servo motor to drive the servo motor while the bridge remains unbalanced, driving means for the second grating connected to the movable element, a second servo motor, a differential connected to the second grating, to the second servo motor and to the potentiometer, a source of light and lenses to pass a beam through said gratings, photocells to measure the synchronization of said gratings, an amplifier connected to said photocells, and a feed back from the amplifier to the second servo motor.

2. In apparatus of the class described, a movable machine element, coarse feed mechanical means to move said element, a first servo motor connected to drive said coarse feed means, fine feed mechanical means to move said element, a second servo motor connected to drive said fine feed means, a clutch between said coarse feed means and said fine feed means to connect the one or the other to move said element, a first potentiometer and a first electric connection to the first servo motor, a driving connection from the machine element to the first potentiometer to drive it, a second potentiometer and a second electric connection to the second servo motor, a driving connection from the machine element to the second potentiometer to drive it, a first Wheatstone bridge incorporating said first potentiometer, means to unbalance said first Wheatstone bridge in such a direction that resultant movement of said first potentiometer eventually restores balance, a second Wheatstone bridge incorporating said second potentiometer, means to unbalance said second Wheatstone bridge in such a direction that resultant movement of said second potentiometer eventually restores balance, and a selector amplifier and relay connected to operate the clutch and to maintain either the first or the second electric connections and to open the other, whereby to move the machine element by coarse feed or fine feed shifting from coarse to fine feed automatically responsive to the selector amplifier.

3. In apparatus as claimed in claim 2, the combination with the parts and features therein specified, of a differential, an input to said differential from the machine element, an output from the differential connected to said second potentiometer, a third servo motor, measuring means to measure the position of said machine element, an output from the measuring means to the third servo motor, and an output from the third servo motor to the differential, thus accurately to position the machine element responsive to unbalance of the second bridge.

4. In apparatus as claimed in claim 3, the combination with the parts and features therein specified, of a pair of gratings as part of the measuring means, one coupled to the machine element and the other coupled to the second potentiometer, means for creating a beam of light and directing it through the gratings, and photo cell means and an amplifier to drive the third servo motor as the output from the measuring means to the third servo motor.

5. In apparatus of the class described, a movable machine element, mechanical means to move said element, a first servo motor connected to drive said mechanical means, a potentiometer and an electric connection to the first servo motor, a driving connection from the machine element to the potentiometer to drive it, a Wheatstone bridge incorporating the potentiometer, means to unbalance the Wheatstone bridge in such a direction that resultant movement of the potentiometer eventually restores balance, whereby to move the machine element responsive to unbalance of the bridge and to stop it when balance is restored, a differential, an input to said differential from the machine element, an output from the differential connected to the potentiometer, a second servo motor, measuring means to measure the position of said machine element, an output from the measuring means to the second servo motor, and an output from the second servo motor to the differential, thus accurately to position the machine element responsive to unbalance of the bridge.

6. In apparatus as claimed in claim 5, the combination with the parts and features therein specified, of a pair of gratings as part of the measuring means, one coupled to the machine element and the other coupled to the potentiometer, means for creating a beam of light and directing it through the gratings, and photocell means and an amplifier to drive the second servo motor as the output from the measuring means to the second servo motor.

7. A transducer comprising a machine element, power means to move said machine element, measuring means continuously to measure the position of the machine element, a differential, an output from the machine element to the differential, a servo motor, an output from the servo motor to the differential, and an input to the servo motor from the measuring means, whereby to correct errors in the power means.

8. A transducer as claimed in claim 7 in which the input to the servo motor from the measuring means includes an amplifier.

9. A transducer as claimed in claim 8 in which the measuring means includes a pair of gratings, one coupled to the machine element and the other coupled to the power means, means for passing a beam of light through the gratings, and photocell means responsive to the beam to determine the input to the servo motor.

10. A transducer as claimed in claim 7 in which the measuring means includes a pair of gratings, one coupled to the machine element and the other coupled to the power means, means for passing a beam of light through the gratings, and photocell means responsive to the beam to determine the input to the servo motor.

11. In apparatus of the class described, a plane grating, a rotatable grating, a movable element connected to said plane grating to move it, a drive from said movable element to rotate said rotatable grating, an optical system to produce a magnified image of said plane grating on said rotatable grating, and photosensitive means to indicate whether said image moves at the same speed as the rotatable grating.

12. In apparatus of the class described, a first movable machine element, a second movable machine element, a mechanical connection between said elements to cause one thereof to move at a given ratio to the other thereof, a continuous grating on one of said elements, a pair of offset gratings in side by side relationship on the other of said elements and of grating size the given ratio to the continuous gratings, light projecting means positioned to produce an image of one of said grating and gratings upon the other thereof of a size the given ratio to the image producer, and a pair of photosensitive means each positioned to pick up light from one offset grating and from the continuous grating including the image of one of the grating and an offset grating and between them picking up light from both offset gratings.

13. In apparatus of the class described, a first movable machine element, a second movable machine element, a continuous grating on one of said elements, a pair of offset gratings in side by side relationship on the other of said elements and of grating size a given ratio to the continuous grating, light projecting means positioned to produce an image of one of said grating and gratings upon the other thereof of a size the given ratio to the image producer, and a pair of photosensitive means each positioned to pick up light from one offset grating and from the continuous grating including the image of one of the gratings and an offset grating and between them picking up light from both offset gratings.

14. In apparatus of the class described, a movable machine element, a potentiometer, a pair of gratings the first of which is connected to said movable machine element and the second of which is connected to said potentiometer, a first servo motor and connections to move said machine element, an electric circuit including said potentiometer and including tap voltage dividing means, means to unbalance said circuit in a direction so that movement of said potentiometer will restore balance, electric power and connections to the circuit and to the first servo motor to drive the servo motor while the circuit remains unbalanced, driving means for the second grating connected to the movable element, a second servo motor, a differential connected to the second grating, to the second servo motor and to the potentiometer, a source of light and lenses to pass a beam through said gratings, photocells to measure the synchronization of said gratings, an amplifier connected to said photocells, and a feed back from the amplifier to the second servo motor.

15. In apparatus of the class described, a machine slide, a light grating connected to said slide, means to direct light upon said grating, lenses to produce an image of said grating due to said light, a drum grating located to receive said image, a mechanical connection from the slide to the drum grating geared to move it synchronously with said image, photosensitive means positioned to detect any misalignment of the drum grating with the image, amplifier means responsive to the photosensitive means, a servo motor responsive to the amplifier means, a differential, one input to the differential from the machine tool slide, another input to the differential from the servo motor, a potentiometer, bridge means to energize the potentiometer, an output from the differential to the potentiometer, a second servo motor driving said machine slide, second amplifier means responsive to unbalance of said bridge connected to said second servo motor, whereby accurately to position said slide in accordance with the setting of said bridge means.

16. An apparatus of the class described, a machine slide, a light grating connected to said slide, means to direct light upon said grating, lenses to produce an image of said grating due to said light, a grating located to receive said image, a mechanical connection from the slide to the grating geared to move it synchronously with said image, photosensitive means positioned to detect any misalignment of the grating with the image, amplifier means responsive to the photosensitive means, a servo motor responsive to the amplifier means, a differential, one input to the differential from the machine tool slide, another input to the differential from the servo motor, a potentiometer, bridge means to energize the potentiometer, an output from the differential to the potentiometer, a second servo motor driving said machine slide, second amplifier means responsive to unbalance of said bridge connected to said second servo motor, whereby accurately to position said slide in accordance with the setting of said bridge means.

17. In apparatus of the class described, a machine slide, a light grating connected to said slide, means to direct light upon said grating, lenses to produce an image of said grating due to said light, a drum grating located to receive said image, a mechanical connection from the slide to the drum grating geared to move it synchronously with said image, photosensitive means positioned to detect any misalignment of the drum grating with the image, amplifier means responsive to the photosensitive means, a servo motor responsive to the amplifier means, a differential, one input to the differential from the machine tool slide, another input to the differential from the servo motor, an angular position conversion means, means to energize said conversion means, a mechanical output from the differential to the conversion means, a second servo motor driving said machine slide, amplifier means responsive to the output of said conversion means to actuate said second servomotor, whereby accurately to position said slide in accordance with the settings of said means for energizing the conversion means.

References Cited in the file of this patent

UNITED STATES PATENTS 2,147,674   Satterlee _____ Feb. 21, 1939

(Other references on following page)

UNITED STATES PATENTS

| | | |
|---|---|---|
| 2,175,820 | Baston | Oct. 10, 1939 |
| 2,230,715 | Cockrell | Feb. 4, 1941 |
| 2,311,142 | Turrettini | Feb. 16, 1943 |
| 2,348,862 | Sorkin | May 16, 1944 |
| 2,397,202 | Potts | Mar. 26, 1946 |
| 2,406,299 | Koulicovitch | Aug. 20, 1946 |
| 2,534,801 | Siltamaki | Dec. 19, 1950 |
| 2,543,950 | Yardeny et al. | Mar. 6, 1951 |
| 2,584,897 | Marco | Feb. 5, 1952 |
| 2,643,355 | Hallman | June 23, 1953 |
| 2,696,578 | Newell | Dec. 7, 1954 |